(12) United States Patent
Galante et al.

(10) Patent No.: US 11,635,243 B2
(45) Date of Patent: Apr. 25, 2023

(54) SCROLL COMPRESSORS WITH DIFFERENT VOLUME INDEXES AND SYSTEMS AND METHODS FOR SAME

(71) Applicant: BITZER Kuehlmaschinenbau GmbH, Sindelfingen (DE)

(72) Inventors: Francesco Galante, Leonberg (DE); Richard G. Kobor, Fayetteville, NY (US)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 39 days.

(21) Appl. No.: 15/706,392

(22) Filed: Sep. 15, 2017

(65) Prior Publication Data

US 2018/0003423 A1 Jan. 4, 2018

Related U.S. Application Data

(63) Continuation of application No. 12/691,887, filed on Jan. 22, 2010, now abandoned.

(Continued)

(51) Int. Cl.
*F25B 49/02* (2006.01)
*F04C 28/02* (2006.01)
(Continued)

(52) U.S. Cl.
CPC ........ *F25B 49/022* (2013.01); *F04C 18/0215* (2013.01); *F04C 23/001* (2013.01);
(Continued)

(58) Field of Classification Search
CPC ................ F25B 31/026; F25B 2400/06; F25B 2400/061; F25B 2400/075;
(Continued)

(56) References Cited

U.S. PATENT DOCUMENTS

| 933,682 A | 9/1909 | Voorhees |
| 4,193,270 A | 3/1980 | Scott |

(Continued)

FOREIGN PATENT DOCUMENTS

| CA | 2 312 175 A1 | 12/2001 |
| CN | 1370956 A | 9/2002 |

(Continued)

OTHER PUBLICATIONS

Hans Jorgen Hogaard Knudsen; Comparison of Energy Consumption for Refrigeration in Supermarkets; Sep. 2004, Appendix A, Danish Environmental Protection Agency.

(Continued)

*Primary Examiner* — Jerry-Daryl Fletcher
*Assistant Examiner* — Daniel C Comings
(74) *Attorney, Agent, or Firm* — Reinhart Boerner Van Deuren P.C.

(57) ABSTRACT

A plurality of scroll compressors with different fixed volume indexes are connected in fluid parallel circuit and configured to selectively operate to maximize isentropic efficiency at different condensing temperatures. Different quantities of scroll compressors of different volume indexes may be selected based upon typical climate or geographic location environmental conditions to attempt to maximize efficiency. A controller may selectively operate different combinations of the compressors of different volume indexes bases up load demands and condensing temperature conditions, which may be determined in a variety of ways.

33 Claims, 5 Drawing Sheets

Related U.S. Application Data

(60) Provisional application No. 61/146,947, filed on Jan. 23, 2009.

(51) Int. Cl.
*F04C 28/06* (2006.01)
*F04C 18/02* (2006.01)
*F04C 23/00* (2006.01)
*F04C 29/04* (2006.01)
*F25B 31/02* (2006.01)
*F25B 1/04* (2006.01)

(52) U.S. Cl.
CPC ............ *F04C 23/008* (2013.01); *F04C 28/02* (2013.01); *F04C 28/065* (2013.01); *F04C 29/04* (2013.01); *F25B 31/026* (2013.01); *F04C 2230/604* (2013.01); *F04C 2240/81* (2013.01); *F25B 1/04* (2013.01); *F25B 2400/06* (2013.01); *F25B 2400/0751* (2013.01); *F25B 2600/0251* (2013.01)

(58) Field of Classification Search
CPC .. F25B 2400/0751; F25B 1/10; F25B 49/022; F25B 2600/0251; F04C 18/0215; F04C 23/008; F04C 28/02; F04C 28/06; F04C 28/065; F04C 29/04; F04C 2240/81
See application file for complete search history.

(56) References Cited

U.S. PATENT DOCUMENTS

| | | | | |
|---|---|---|---|---|
| 5,170,636 | A * | 12/1992 | Hitosugi | F04C 23/001 236/1 EA |
| 6,398,530 | B1 | 6/2002 | Hasemann | |
| 6,769,258 | B2 * | 8/2004 | Pierson | F01K 23/10 60/772 |
| 6,814,551 | B2 | 11/2004 | Kammhoff et al. | |
| 6,960,070 | B2 | 11/2005 | Kammhoff et al. | |
| 7,112,046 | B2 | 9/2006 | Kammhoff et al. | |
| 7,178,352 | B2 * | 2/2007 | Lifson | F04C 18/165 418/196 |
| 7,409,833 | B2 | 8/2008 | Unger et al. | |
| 2004/0016241 | A1 * | 1/2004 | Street | G05D 23/1917 62/157 |
| 2005/0223726 | A1 | 10/2005 | Lifson | |
| 2008/0011014 | A1 | 1/2008 | Renz et al. | |
| 2008/0163642 | A1 * | 7/2008 | Okamoto | F25B 9/008 62/402 |
| 2009/0185929 | A1 * | 7/2009 | Duppert | F01C 21/007 418/55.1 |
| 2009/0255278 | A1 * | 10/2009 | Taras | F25B 49/025 62/115 |
| 2010/0170295 | A1 * | 7/2010 | Okazaki | F04C 18/0215 62/510 |

FOREIGN PATENT DOCUMENTS

| | | |
|---|---|---|
| CN | 1464199 A | 12/2003 |
| CN | 1517559 A | 8/2004 |
| EP | 1361364 B1 | 10/2006 |
| JP | 01-262390 | 10/1989 |
| JP | H0861274 A | 3/1996 |
| JP | 2002-257424 A | 11/2002 |
| JP | 2005-061784 A | 3/2005 |
| JP | 2006-258330 | 9/2006 |
| JP | 2007198693 A | 8/2007 |
| WO | WO 2008/082410 A1 | 7/2008 |

OTHER PUBLICATIONS

Reindl Douglas T et al: "IRC TechNote Selection of Screw Compressors for Energy Efficient Operation Screw Compressors: Selection Considerations for Efficient Operation Background", Jan. 1, 2002 (Jan. 1, 2002), XP055793352.

Sauble Gary Schrift: "Maximizing Screw Compressor Performance", Jan. 1, 2005 (Jan. 1, 2005), XP055793349.

Phillippi Greg: "Copyright 2016 by Turbomachinery Laboratory, Texas A&M Engineering Experiment Station Basic Thermodynamics of Reciprocating Compression", Sep. 15, 2016 (Sep. 15, 2016), XP055793350.

* cited by examiner

SCROLL COMPRESSORS WITH DIFFERENT VOLUME INDEXES AND SYSTEMS AND METHODS FOR SAME

CROSS-REFERENCE TO RELATED PATENT APPLICATIONS

This patent application is a continuation of co-pending U.S. patent application Ser. No. 12/691,887, filed Jan. 22, 2010, which claims the benefit of U.S. Provisional Patent Application No. 61/146,947, filed Jan. 23, 2009, the entire teachings and disclosure of which are incorporated herein by reference thereto.

FIELD OF THE INVENTION

The present invention relates to scroll compressors for compressing refrigerant and more particularly to efficiency improvements relative to a bank of two or more compressors that may be implemented in a cooling/refrigeration circuit, and is particularly advantageous for such compressors that have a built-in fixed volume index such as scroll or screw compressors.

BACKGROUND OF THE INVENTION

A scroll compressor is a certain type of compressor that is used to compress refrigerant for such applications as refrigeration, air conditioning, heat pumps, industrial cooling and freezer applications, and/or other applications where compressed fluid may be used. Such prior scroll compressors are known, for example, as exemplified in U.S. Pat. No. 6,398,530 to Hasemann; U.S. Pat. No. 6,814,551, to Kammhoff et al.; U.S. Pat. No. 6,960,070 to Kammhoff et al.; and U.S. Pat. No. 7,112,046 to Kammhoff et al., all of which are assigned to a Bitzer entity closely related to the present assignee. As the present disclosure pertains to improvements that can be implemented in these or other scroll compressor designs, the entire disclosures of U.S. Pat. Nos. 6,398,530; 7,112,046; 6,814,551; and 6,960,070 are hereby incorporated by reference in their entireties.

As is exemplified by these patents, scroll compressors conventionally include an outer housing having a scroll set contained therein. A scroll compressor, and more particularly a scroll set, includes first and second scroll compressor members. A first compressor member is typically arranged stationary and fixed in the outer housing. A second scroll compressor member is moveable relative to the first scroll compressor member in order to compress refrigerant between respective scroll ribs which rise above the respective bases and engage in one another. Conventionally the moveable scroll compressor member is driven about an orbital path about a central axis for the purposes of compressing refrigerant. An appropriate drive unit, typically an electric motor, is provided usually within the same housing to drive the movable scroll member.

Scroll compressors and/or other types of compressors are positive displacement machines and thereby may have a fixed and therefore non-adjustable "volume index". Such compressors trap a fixed volume of fluid (e.g. typically a pure gas state) on the suction side and increase the pressure by reducing the volume occupied by the fluid in a compression chamber, thereby raising the fluid pressure on the discharge side. The volume index is the ratio of the volume of suction gas in the compression chamber cavity (when it closes) to the volume of gas in the compressor chamber cavity (when it opens). This Volume index (Vi) provides for the internal pressure ratio for the compressor.

One drawback with employing such fixed positive displacement compressors is that the efficiency curve is fixed relative to operating temperature or to part load operation (e.g. due to condensing temperature differences due to seasonal changes as between summer and winter). While making variable geometry compressors is possible, these adjustable machines have other drawbacks such as increased parts (e.g. controls and actuators and mechanical geometry adjustment structure) and thereby increased complexity and typically a substantial increased cost.

BRIEF SUMMARY OF THE INVENTION

A general objective of the present invention is to increase efficiency of compressors systems operating in both full or part load conditions. Further, the system can be optimized depending on various environmental conditions.

It is a further subsidiary objective according to the above objective to provide such efficiency gains in compressors that have a fixed volume index. However, it will be recognized from the description herein that this subsidiary objective is not limited to fixed volume index compressors alone.

In accordance with either or both of the objectives above, one aspect of the present invention is directed toward a compressor arrangement comprising a plurality of refrigerant compressors connected in parallel circuit in which each refrigerant compressor has a volume index. The compressors include at least one first compressor and at least one second compressor in which each first compressor has a volume index different than each second compressor.

According to the above aspect, the first and second compressors may be fixed volume index compressors, e.g. scroll or screw compressors. Each of the first and second compressors have a volume index different from the other. For example, in one embodiment, the first compressor has a higher volume index than the second compressor. There may be a relation between the first and second compressor in which each first compressor has a higher isentropic efficiency at a high temperature range for saturated condensing temperature. In contrast, each second compressor may have a higher isentropic efficiency at a low temperature range for saturated condensing temperature. There may be an intermediate range between the high temperature and low temperature range where efficiencies are roughly equivalent or of relatively small difference.

According to the above aspect, one of the compressors may be substantially optimized for air cooling (thereby having a higher condensing temperature) and the other type of compressor substantially optimized for water cooling (thereby having a lower condensing temperature). Different volume indexes generally indicate different condenser optimizations. Notwithstanding the same, even if the system is selected for air cooling, it may include a combination of air-cooled optimized compressors and water-cooled optimized compressors; or if it is water or liquid cooled, the arrangement may also include compressors optimized for air cooling in combination with compressors optimized for water cooling. The combination of compressors selected is based upon at least, in part, maximizing isentropic efficiency due to operating conditions that are anticipated to be used at a given geographic location. The combination of compressors selected is also based upon at least, in part, maximizing the Seasonal Energy Efficiency Ratio (SEER) and the Integrated Part Load Value (IPLV).

Yet a further subsidiary aspect of the present invention may include a controller that is in operative communication with both types of refrigerant compressors for individually turning the refrigerant compressors on and off (including optionally modulating and otherwise controlling the compressors). The controller can be configured to selectively operate the first and second compressors in response to a demand load and a determination of different saturated condensing temperature conditions. Preferably the controller selects between the first and second compressors or combination thereof based upon maximizing isentropic efficiency. For example, when it is determined to be in the first high temperature range, the controller may operate the first compressors to the extent necessitated by the demand load and operate the second compressors only as necessary to meet the demand load when all of the first compressors are already operating. However, when temperatures are typically lower and it is determined to be in the second low temperature range, the controller may operate the second compressors to the extent necessitated by a demand load and operate the first compressors only as necessary to meet the demand load when all of the second compressors are already operating. If there is an intermediate range between high and low temperature ranges, different logic or different combinations may either be pre-selected for the compressors depending on other considerations, while still maximizing efficiency given the negligible efficiency differences that may be provided in an intermediate range.

Various ways may be used to provide a determination of the temperature range of condensing temperatures. For example, the sensed pressure of a refrigeration system detected using a pressure sensor can be indicative of the saturated condensing temperature. Alternatively, actual temperature detected using temperature sensors and/or other such data, i.e. date or seasonal information indicative of the current environment or climate, can be used to determine whether the compressor arrangement is in a higher temperature range or lower temperature range of condensing temperatures. The operating load demand may also itself indicate the operating condensing temperature such as for an air conditioner system when lower demand loads indicate a lower condensing temperature range and higher demand loads indicate a higher condensing temperature range. Combinations of such sensors and other data or information may be used to derive such a determination.

The compressor arrangement may comprise two, three or four or more compressors operating in one, two or more banks and one, two or more different refrigerants circuits, but it is extensible to all different compressor arrangements and technologies with a fixed volume index. Further, the compressors may be arranged in a single bank or divided up among different banks of scroll compressors that may be commonly mounted with common suction and discharge pipes and common mounting rails. Separate or combined circuits may be used with the banks.

Another aspect is directed toward a method of compressing refrigerant comprising arranging at least two refrigerant compressors in fluid parallel having different built in volume indexes; and selectively operating the at least two refrigerant compressors based on saturated condensing temperature.

The saturated condensing temperature may be determined by at least one factor selected from the group consisting of: demand load, actual temperature, refrigerant pressure, and seasonal date data. Preferably, it is pressure based information that can include sensing a suction pressure upstream of the at least refrigerant compressors; and determining the saturate condensing temperature based on the suction pressure (e.g. with a known refrigerant, suction pressure correlates to and is thus indicative of saturated condensing temperature).

The above method may further include the subsidiary aspect of: selectively operating the refrigerant compressors in response to a load demand; determining which of the different refrigerant compressors are more efficient at a present state of the saturated condensing temperature; operating only the refrigerant compressors determined to be more efficient at the present state of the saturated condensing temperature to satisfy the demand load; and operating the refrigerant compressor determined to be less efficient in the event the demand load cannot be satisfied by the refrigerant compressors determined to be more efficient.

According to the subsidiary aspect, the method may further include: selectively operating the refrigerant compressors in response to a load demand; operating only the refrigerant compressors having a lowest volume index at a low load demand; and operating all of the refrigerant compressors at a maximum load demand. If an intermediate load demand is provided, the method may further involve operating a mix of refrigerant compressors with different volume indexes at an intermediate load demand between lowest and maximum load demand to attempt to optimize efficiency.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
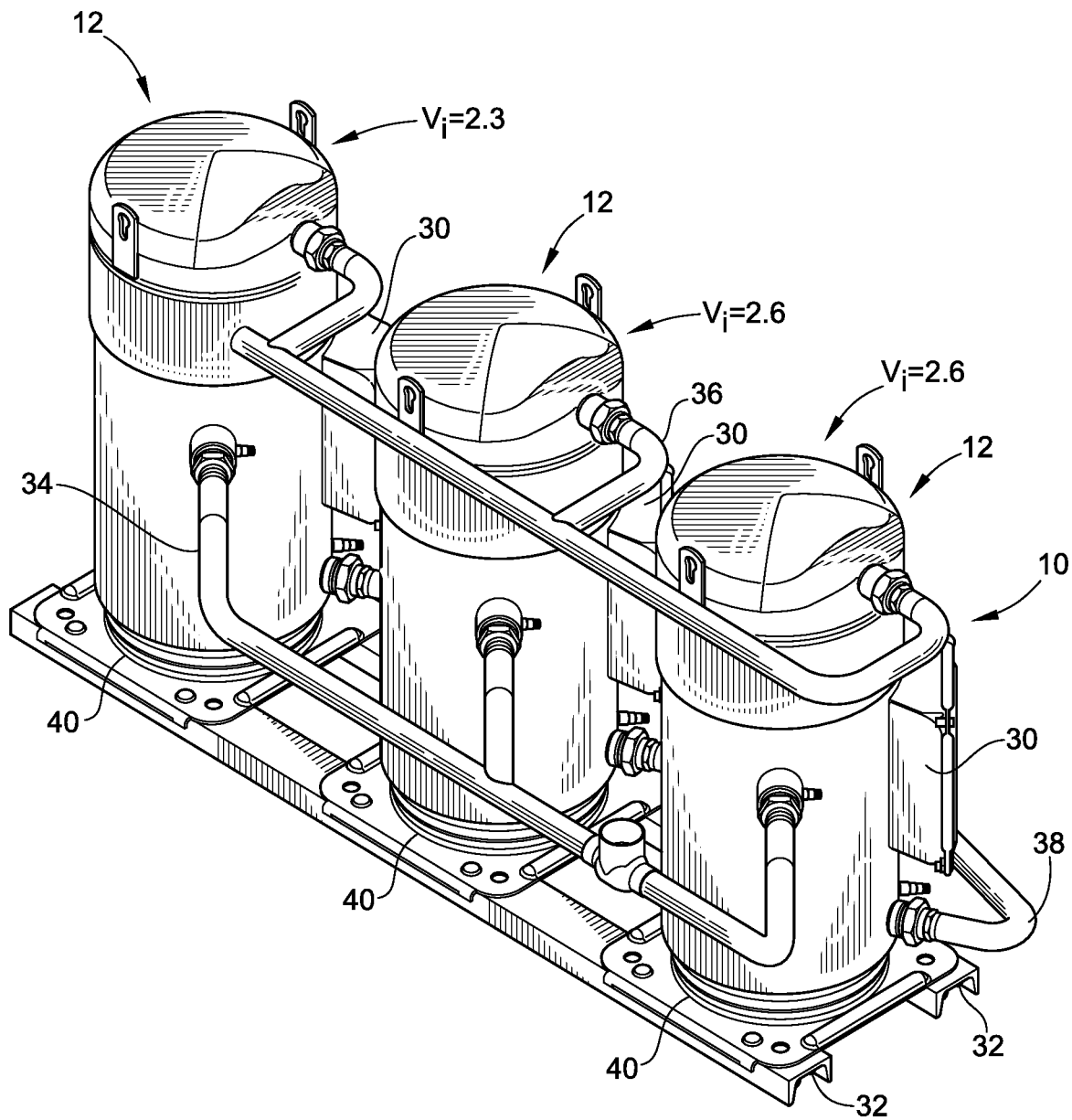
FIG. 1 is an isometric view of multiple scroll compressor assemblies that are mounted in parallel fluid circuit and in a common bank that may further be mounted on a common pair of mounting rails in accordance with an embodiment of the present invention.

An embodiment of the present invention has been illustrated in FIG. 1 as at least one bank 10 of compressors of at least two different volume indexes, such as scroll compressors 12, connected in fluid parallel circuit. Each scroll compressor as illustrated in FIG. 1 may be a fixed positive displacement machine that has a non-adjustable built in fixed volume index in that the geometry of scrolls and the compressor chambers that are formed are not adjustable during operation. The bank 10 of scroll compressors may be used in a variety of systems to include air conditioning or chillers, reversible heat pumps, refrigeration units, industrial cooling applications and other such refrigerant circuits (herein cooling and refrigeration and other similar words are used interchangeably and mean the same thing and apply broadly to all such applications indicated).

Figure 2:
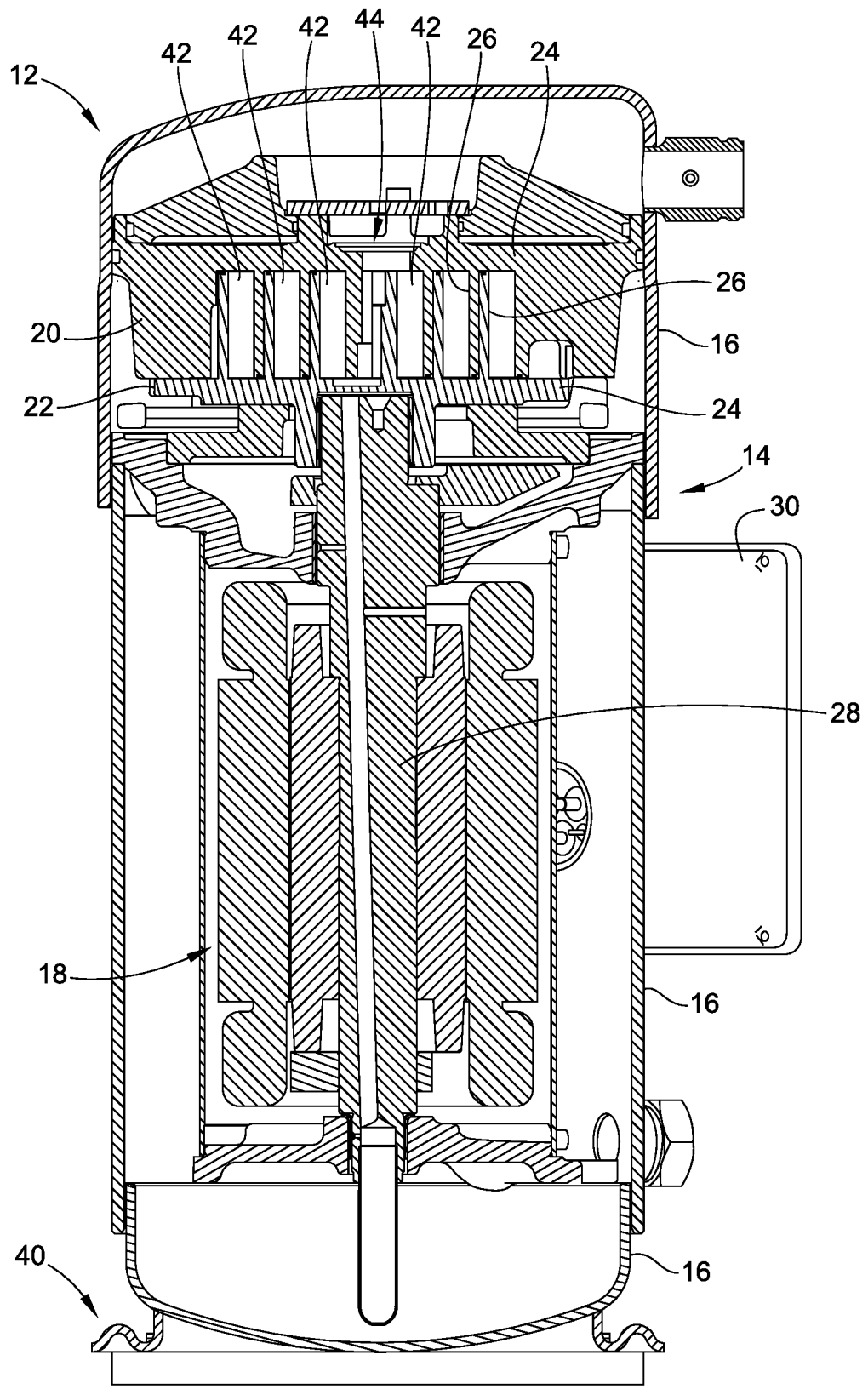
FIG. 2 is a cross section of one of the scroll compressors shown in FIG. 1.

Before turning to the details of the parallel circuit bank with different volume indexes, some background about a scroll compressor 12 as shown in FIG. 2 will be provided for orientation and description purposes, although it is understood that this invention may be applicable to other compressor configurations such as those discussed in the background for example, especially such configurations with a fixed (e.g. no adjustable) volume index. The scroll compressor 12 generally includes an outer housing 14 that typically comprises one or more stamp-formed sheet steel shell sections 16 that are welded together. Contained within the housing 14 is a drive unit 18 that may take the form of an electrical motor and a pair of scroll compressor bodies to include a fixed scroll compressor body 20 and a movable scroll compressor body 22. The scroll compressor bodies 20, 22 have respective bases 24 and respective scroll ribs 26 that project from the respective bases 24 and which mutually engage for compression of fluid. The drive unit 18 has a rotational output on a drive shaft 28 that is operable to drive the movable scroll compressor body 22 about an orbital path relative to the fixed scroll compressor body 20 and thereby facilitates the compression of fluid. The drive unit 18 is electrically connected via wiring to a local electrical panel and box 30 that is carried on the housing 14. Further details of such a scroll compressor arrangement are further described in the aforementioned patents which have been hereby incorporated by reference in their entireties.

Figure 3:
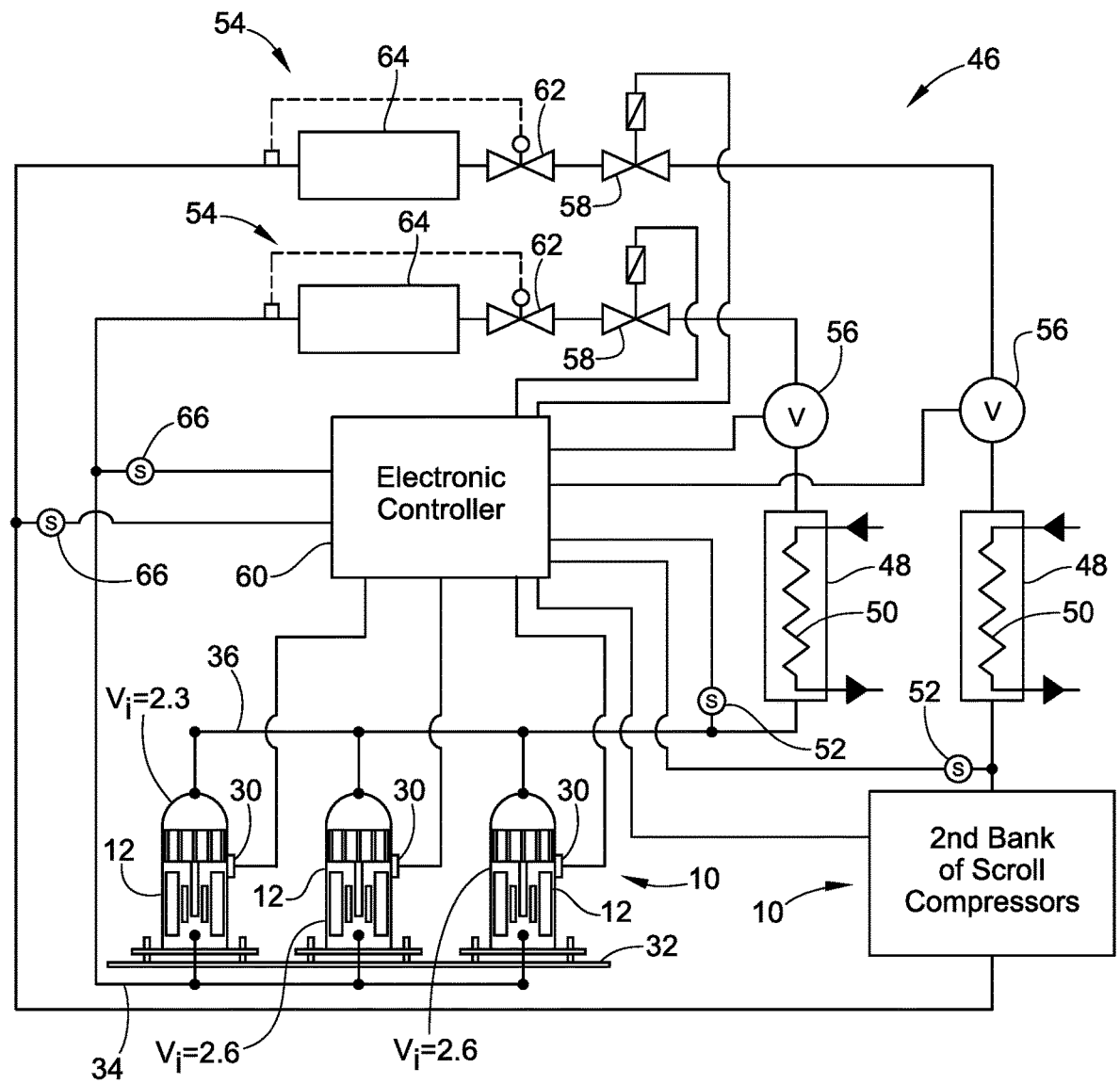
FIG. 3 is a schematic view of a cooling system employing at least one bank of scroll compressors.
Figure 4:
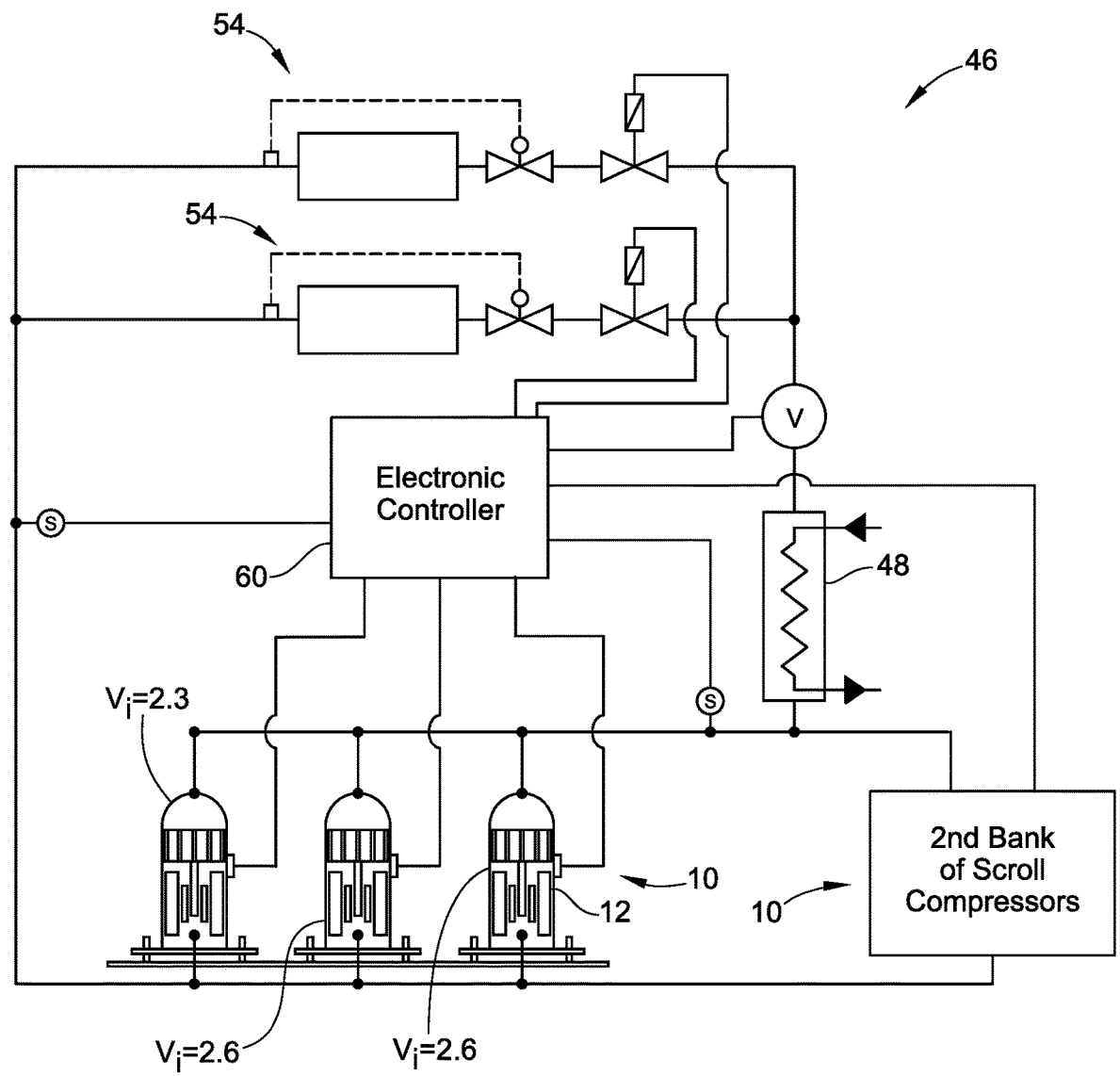
FIG. 4 is a schematic view of a cooling system employing at least one bank of scroll compressors, according to an alternative embodiment of FIG. 3, but with similar reference numbers indicated to indicate like components.

Referring again to FIG. 1, each scroll compressor 12 may be commonly mounted on common mounting rails 32 via mounting bases 40 to form at least one bank 10 of scroll compressors. Multiple banks (as schematically indicated in FIGS. 3 and 4) may be employed, with the compressors 12 connected among each other in parallel circuit as shown. To facilitate parallel connection, each scroll compressor may have a suction inlet connected to a common low pressure suction pipe 34, and a discharge outlet connected to a common high pressure outlet pipe 36. The lubricating oil sumps may also optionally be connected via a common line 38.

As also indicated in FIG. 1, different scroll compressors may be different models, sizes or types (e.g. with different scroll member geometry) to provide different fixed built in volume indexes (Vi). For example, in FIG. 1, one of the illustrated scroll compressors is shown to have a Vi of 2.3 and in an embodiment may be optimized for water cooling applications (e.g. in which the condensing temperature is lower). Also shown in FIG. 1 is that two of the illustrated scroll compressors are shown to have a Vi of 2.6 and in an embodiment may be optimized for air cooling applications (i.e. in which the condensing temperature is higher). The volume index is the ratio of the volume of suction gas in the compression chamber 42 when it closes (i.e. see chambers 42 formed between scroll members in FIG. 2) to the volume of gas in the compressor chamber 42 when it opens. This Volume index (Vi) provides for the internal pressure ratio for the compressor. In a scroll compressor (with reference to FIG. 1) the volume of each compression chamber 42 progressively decreases in volume during operation as the compression chamber is moved radially inward due to the movement until it discharges into a discharge port and through a check valve 44.

The present invention contemplates using compressors of different volume indexes (Vi) for purposes of increasing efficiency due to different condensing temperatures that may be experienced in a given application and/or geographic region. Embodiments contemplate different combinations of compressors with Vi depending upon the typical load demand at different temperature ranges and the time % during a year that will typically be spent in that range.

The benefits of using different compressors of different Vi in combination can be realized with the performance efficiency distinctions experienced by the different compressors. In this regard and referring to FIG. 5, it is seen that different compressors may perform differently at different saturated condensing temperatures. As shown, the efficiency graphs for two different compressors are shown, one having a higher volume index (Vi) and another having a lower volume index (Vi). Maximum efficiencies may be separated by at least 5 degrees F. of temperature. Additionally, it is seen that at lower temperatures the low Vi compressor is significantly more efficient (preferably at least 2% more efficient, and at some temperatures at least 5% more efficient); and in contrast at higher temperatures the higher Vi compressor is significantly more efficient. Further there may optionally be an intermediate range (that may or may not start and stop at the maximum efficiencies as shown) over which there may be marginal or relatively insignificant efficiency differences such that other logic may be used over that range relative to operation.

Turning to FIGS. 3 and 4, different refrigeration cooling systems are illustrated showing different embodiments of a system incorporating one or more banks 10 of the scroll compressors 12. FIG. 3 illustrates a system employing separate refrigeration circuits for each bank, and FIG. 4 illustrates a system wherein the banks are connected in parallel feeding a common refrigeration circuit.

Referring to FIG. 3, the illustrated cooling system includes two separate banks 10 of scroll compressors 12 connected in parallel circuit, but each feeding a separate dedicated refrigeration circuit 46. Each refrigeration circuit 46 includes a condenser 48 connected in series to the high pressure outlet pipe 36 of the scroll compressor bank 10. The condenser 48 is illustrated to have fluid flow heat exchanger 50 (e.g. air, or in another embodiment liquid) flow across to cool and thereby condense high pressure refrigerant. A pressure sensor 52 may be interposed to sense high pressure refrigerant pressure along the outlet pipe 36 (e.g. upstream of the condenser and downstream of the scroll compressors). The pressure sensor 52 provide electrical feedback indicative of sensed pressure to an electronic controller 60.

At least one cooling expansion unit 54 (if multiple units 54 on a circuit then arranged typically in parallel) is also arranged in fluid series downstream of the condenser 48. Optional control valve unit 56 (e.g. as in US Patent Publication 2008/0011014) or other controls may optionally be interposed between the expansion unit 54 and the condenser 48. The expansion unit 54 typically will include an on/off stop valve 58 controlled by a controller 60 to allow for operation of the expansion unit to produce cooling when necessitated by a demand load or to preclude operation of the expansion unit when not necessitated. The expansion unit 54 also includes an expansion valve 62 that may be responsive or in part controlled by pressure downstream of the expansion unit heat exchanger) that controls discharge of refrigerant into a heat exchanger 64, wherein due to the expansion, heat is absorbed to expand the refrigerant to a gas state thereby creating a cooling/refrigeration effect at the heat exchanger 64.

The expansion unit 54 returns the expanded refrigerant in a gas state along the low pressure suction pipe 34 to the bank 10 of scroll compressors 12. A pressure sensor 66 is interposed along the return between the expansion unit 54 and the scroll compressors 12 to sense pressure along the suction side as experienced in the suction pipe 34. The pressure sensor 66 provides electrical feedback indicative of sensed pressure to the controller 60. The controller 60 is also electrically connected to each electrical box 30 for each of the scroll compressors 12 to individually turn the compressors on and off, and to otherwise control the compressors as may be appropriate.

Referring to FIG. 4, it is seen that both banks 10 of compressors 12 may collectively be arranged in parallel in the same circuit alternatively feeding a common condenser 48 that may output to one or more expansion units 54 as illustrated. This circuit also work with the same refrigeration cycle as does the first through compression of refrigerant, condensing of refrigerant, expansion of refrigerant and return of the refrigerant to the beginning of the cycle. This illustrates that different circuit configurations are possible.

In either refrigeration circuit configuration of FIG. 4 or FIG. 3, the controller 60 can operate according to embodiments of the invention as discussed below. As noted, the controller that is in individual operative communication with both types of refrigerant compressors (both high Vi and low Vi compressors), to individually and selectively control different compressors depending upon load demand and environmental conditions (e.g. condensing temperature). The controller 60 can thus individually turn the refrigerant compressors 12 on and off (including optionally modulating and otherwise controlling the compressors). The controller 60 will be preconfigured with logic that automatically selects the compressors based upon demand load and the temperature conditions (as may be determined by being actual or calculated from other data).

Figure 5:
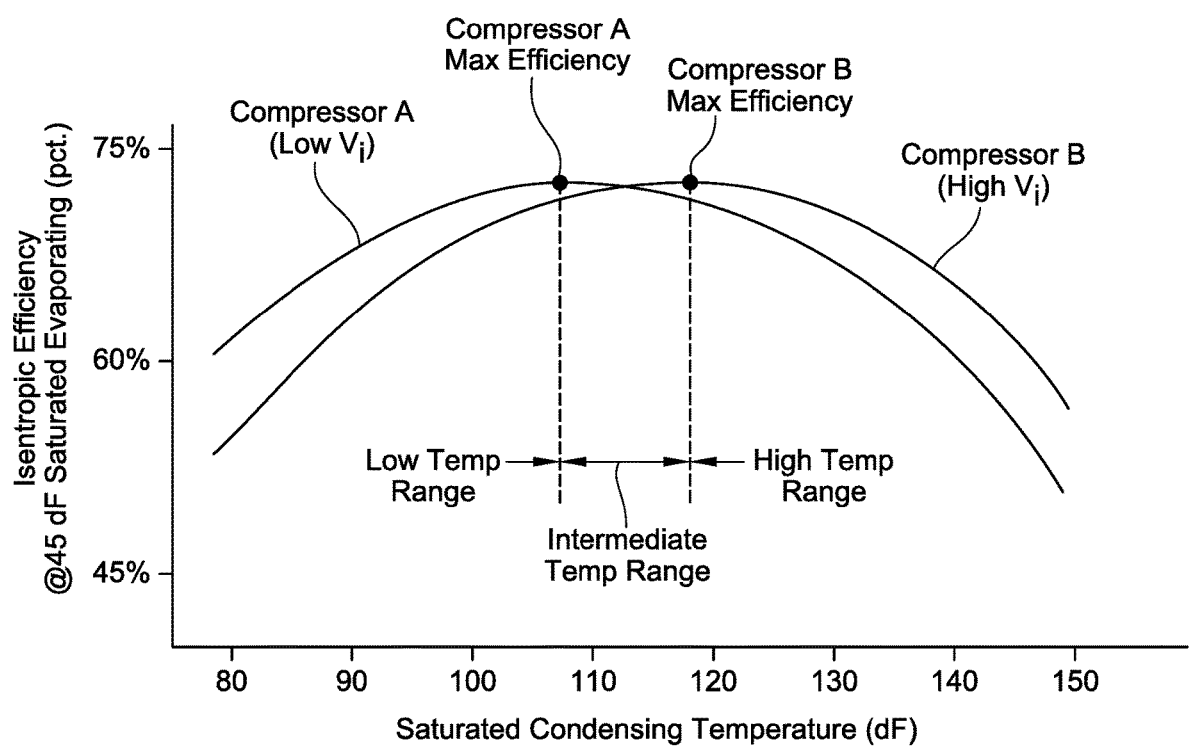
FIG. 5 is a graph illustrating the isentropic efficiencies of a low volume index compressor and a high volume index compressor at different operating condensing temperatures.

In an embodiment, the controller 60 is be configured to selectively operate the high Vi or low Vi compressors 12 in response to a demand load and a determination of different saturated condensing temperature conditions. In combination with what is shown in FIG. 5, preferably the controller 60 selects between the high Vi or low Vi compressors 12 or combination thereof based upon maximizing isentropic efficiency. For example, when it is determined to be in the first high temperature range (see FIG. 5), the controller 60 may operate the high Vi compressors to the extent necessitated by the demand load and operate the low Vi compressors only as necessary to meet the demand load when all of the high Vi compressors are already operating.

However, when temperatures are determined to be in the second low temperature range (see e.g. FIG. 5), the controller 60 may operate the high Vi compressors to the extent necessitated by a demand load and operate the low Vi compressors only as necessary to meet the demand load when all of the second compressors are already operating. In this manner, efficiency is maximized. If there is an intermediate range between high and low temperature ranges, different logic or different combinations may either be pre-selected for the compressors depending on other considerations.

Various ways may be used to provide a determination of the temperature range of condensing temperatures. For example, the pressure sensors 52, 66 provide the pressure of the system which is indicative of the saturated condensing temperature. In particular, for a given refrigerant, an AC system will evaporate at a certain temperature which is linked to a precise pressure for the given refrigerant. Thus, the pressure signal(s) may be used to determine temperature. Alternatively, actual temperature sensors and/or other such data such as date or seasonal information that would be indicative of the current environmental client and thereby whether the compressor arrangement is in a higher temperature range or lower temperature range. For example, at mid summer for an air cooled system, it would be presumed and thereby determined that a high temperature is experienced. The operating load demand may also itself indicate the operating condensing temperature such as for an air conditioner system when lower demand loads indicate a lower condensing temperature range and higher demand loads indicate a higher condensing temperature range. Thus a determination of temperature may simply be derived from demand load. Combinations of such sensors and other data or information may be used to derive such a temperature determination.

With this understanding a working contemplated example below will be explained implementing an embodiment of the present invention.

CONTEMPLATED EXAMPLE

To demonstrate the above concept, a practical contemplated example is discussed below for a conditioning chiller that is optimized for efficiency using two types scroll compressors having different volume indexes (Vi). For purposes of demonstration, it will be assumed the following application environment parameters:

System: air cooled chiller supplying around 360 kW (max cooling capacity nominally required)→double circuit with a trio operating on each circuit Geographical area: Southern Europe (Italy, Spain)

Objective: to optimize the system in terms of both EER (full load) and SEER (part load), in agreement to a customer and application requirements Given these application and environmental parameters, a total of 6 scroll compressors will be therefore used: of them one compressor per circuit will be chosen with a $V_i$=2.3 (i.e. a Bitzer model #GSD8-295VW, water cooled/low condensing temperature optimized) while the other two with a $V_i$=2.6 (i.e. a Bitzer model #GSD8-295VA, air cooled/high condensing temperature optimized).

During the year several operating conditions will alternate, as consequence of a different cooling request. The system control will regulate the supplied cooling capacity by switching off/on the number of compressors required, as commonly already done. The advantage of the "scroll mix" is that the system will possibly select only the compressors that are more performing under the required conditions.

Based on this configuration, it is possible to illustrate the efficiency benefit below for three situations, among the six in this case possible: 100%, 83.3%, 66.7%, 50%, 33.3% and 16.7% of the full load.

A. Full load, 100%: All 6 Compressors are Switched On.

The season is hot summer/mid summer which typically experience the highest condensing temperatures.

In terms of total energy efficiency, in this case, the "weight" of the 4 compressors with $V_i$=2.6 will be prevailing. The performance of the whole AC system will be therefore tending to the values of the compressors optimized for higher condensing temperatures ($V_i$=2.6). The two compressors with lower $V_i$ are capable of running also in these conditions.

Considering the relatively short (in relation to the whole year for the given region) period on which the system is running at full load, the slight decrease of efficiency due the influence of the two compressors with lower $V_i$ will be very little compared to the efficiency of an equivalent system mounting all six "air cooled" compressors.

The efficiency of this system, by the way, is greatly higher than the one of an equivalent system mounting all six compressors with a lower $V_i=2.3$; this in the case that we would have chosen to optimize the AC system only in terms of part load operations.

B. Part Load, 66.7%: 2 Compressors $V_i=2.3$ and 2 Compressors $V_i=2.6$ Switched On, 2 Compressors $V_i=2.6$ Switched Off.

The season is "fresh summer" beginning of summer and the end of summer, which typically provides for medium condensing temperatures and part load demands. Further, because the condenser size remains fixed, the condensing temperature is lower in part load operation.

In this case the efficiency of the system will be already influenced by the higher efficiency of the 2 compressors with $V_i=2.3$. The two compressors with higher $V_i$ will still offer acceptable performances. Possibly the efficiency increase due to the two compressors with lower $V_i$ will be bigger than the efficiency decrease due to the two compressors with higher $V_i$, or —in the worse case— the two effects will mutually compensate each other (this is function of the real condensing temperature and also depends on the exact behavior of the isentropic efficiency curves of the compressors).

By the way, the total efficiency of the system in this case will be certainly higher than the one of an equivalent system equipped with all four compressors with $V_i=2.6$. This is the efficiency advantage offered by the "scroll mix" at the given conditions.

C. Part Load, 33.3%: 2 Compressors $V_i=2.3$ on, 4 Compressors $V_i=2.6$ off.

The season is spring, autumn, or very early or very late summer in which low condensing temperatures are typically expected.

These temperature conditions are similar to those of a water cooled chiller and therefore the advantage, in terms of efficiency, becomes in this case even more conspicuous.

The efficiency of the system in these conditions is certainly much higher than the one of an equivalent system equipped with compressors optimized for air cooled conditions ($V_i=2.6$). Practically, one will obtain exactly the same efficiency of a system only equipped with compressors with lower $V_i=2.3$ but without giving up the high efficiency of the system at full load conditions.

Other Operating Capacities

In the above example, we have in total 6 compressors, split into 2 circuits (3 compressors per circuit). The configurations 100%, 66.7% and 33.3% are indicated above, but it is also possible to run other part load configurations. For example, at 83.3% operating capacity, 5 compressors are switched on, with the first bank/circuit operating with 3 compressors in full load and the second bank/circuit with 2 compressors—part load 66.7%. At 50%, 3 compressors are switched on; the first circuit operates with 2 compressors (66.7% part load), and the second with 1 compressor 33.3% part load). At 16.7% operating capacity, only 1 compressor is switched on with one circuit is operating with 1 compressor at 33.3% part load and the other one is completely switched off. It is noted that the exact behavior in this case depends on the lay-out and design of the system (one condenser or two separate condensers).

Conclusions From Example

After quantifying, if the efficiencies of the system are summed at the different operating conditions during the whole year, one can expect that the total efficiency will be higher for a system with a "scroll mix" than for an equivalent system using all compressors with the same $V_i$ (either higher or lower). This is explainable because, in terms of efficiency, the "scroll mix" relies on the most efficient compressors, in correspondence of a certain operating condition. Similarly if in another case an optimization weighted toward part load conditions, i.e. low condensing temperatures, is required, more compressors (i.e. 3 or 4) with lower $V_i$ will be selected in order to increase the "weight" of the compressors optimized for lower condensing temperatures. In each case the exact mix is to be readily calculated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A compressor arrangement, comprising:
a plurality of refrigerant compressors connected in parallel circuit, each refrigerant compressor having a volume index, the plurality of refrigerant compressors including at least a first compressor and a second compressor, wherein each of the first compressor and the second compressor include a single inlet, a single outlet, and a single flowpath extending between the single inlet and the single outlet, and wherein each of the first compressor and the second compressor includes a housing and a respective internal electrical motor to drive a respective compressor body contained within said housing, the first compressor having a different volume index than the second compressor, wherein the volume index of the first compressor and the second compressor is fixed and non-variable, and wherein the plurality of compressors share a common suction line and share a common discharge line, each of the respective compressor bodies of the first and second compressors being driven only by the respective internal electrical motor thereof.

2. The compressor arrangement of claim 1, wherein the first and second compressors are scroll compressors.

3. The compressor arrangement of claim 2, wherein in relative relation between the first and second compressors, each first compressor has a higher isentropic efficiency at a high temperature range for saturated condensing temperature, and wherein each second compressor has a higher isentropic efficiency at a low temperature range for saturated condensing temperature, the high temperature range being higher than the low temperature range.

4. The compressor arrangement of claim 3, wherein each first compressor is substantially optimized for air cooling, and wherein each second compressor is substantially optimized for water cooling.

5. The compressor arrangement of claim 3, further comprising:
a controller in operative communication with the refrigerant compressors for individually turning refrigerant compressors on and off; the controller configured to selectively operate the first and second compressors in response to a demand load and a determination of different saturated condensing temperature conditions.

6. The compressor arrangement of claim 5, wherein the controller selects between the first and second compressors or combination thereof based on maximizing isentropic efficiency.

7. The compressor arrangement of claim 6, wherein,
when determined to be in the high temperature range, the controller operating the first compressor to the extent necessitated by the demand load, and operating the second compressor only as necessary to meet the demand load when the first compressor is already operating; and
when determined to be in the low temperature range, the controller operating the second compressor to the extent necessitated by a demand load, and operating the first compressor only as necessary to meet the demand load when the second compressor is already operating.

8. The compressor arrangement of claim 5, further comprising at least one sensor adapted to sense an environmental condition indicative of the high and low temperature ranges, the sensor in communication with the controller, the controller determining whether a high or low temperature range exists based on sensed environmental conditions of the at least one sensor.

9. The compressor arrangement of claim 8, wherein the plurality of refrigerant compressors is integrated in a cooling system, the cooling system including:
an expansion unit including an expansion valve and an expansion unit heat exchanger, the expansion unit arranged in fluid series with the plurality of refrigerant compressors; and
a condenser interposed between the expansion unit and the plurality of refrigerant compressors;
wherein the plurality of refrigerant compressors compress a refrigerant fluid, which is condensed in the condenser, then expanded in the expansion unit and then returned to the plurality of refrigerant compressors.

10. The compressor arrangement of claim 9, wherein said at least one sensor is a pressure sensor in communication with a refrigerant suction line upstream of the plurality of refrigerant compressors, the controller determining whether a high or low temperature range exists based upon sensed pressure.

11. The compressor arrangement of claim 10, wherein the controller selectively operates the first and second compressors on a factor other than maximizing isentropic efficiency when in an intermediate temperature range intermediate of the high and low temperature ranges.

12. The compressor arrangement of claim 5, wherein the controller uses the demand load to determine saturated condensing temperature, wherein the demand load is indicative of saturated condensing temperature with a relative higher demand load indicating a higher saturated condensing temperature and a relative lower demand load indicating a lower saturated condensing temperature.

13. The compressor arrangement of claim 5, wherein the controller uses at least one of a temperature sensor and seasonal date information to determine saturated condensing temperature.

14. The compressor arrangement of claim 2, further comprising a common mounting rail, with both first and second refrigerant compressors commonly mounted on the mounting rail.

15. The compressor arrangement of claim 1, wherein the compressor housing of the first compressor completely encloses compressor bodies of the first compressor and wherein the compressor housing of the second compressor completely encloses compressor bodies of the second compressor.

16. The compressor arrangement of claim 1, further comprising a common refrigerant suction pipe connecting inlet ports of each of the refrigerant compressors in a bank, and a compressed refrigerant pipe connecting the outlet ports of each of the refrigerant compressors in the bank.

17. The compressor arrangement of claim 1, wherein the first and second compressors are screw compressors.

18. The compressor arrangement of claim 1, further comprising an expansion unit, wherein the expansion unit is operable independent of the plurality refrigerant compressors.

19. The compressor arrangement of claim 1, wherein the plurality of refrigerant compressors is arranged in a first bank of compressors, and a second plurality of refrigerant compressors is arranged in a second bank of compressors, the second bank of compressors being independently operable from the first bank of compressors.

20. A method of compressing refrigerant, comprising:
arranging at least two refrigerant compressors in fluid parallel having different built in fixed, non-variable volume indexes, wherein each compressor of the at least two compressors has a single inlet, a single outlet, and a single flowpath extending between the inlet and the outlet, and wherein each of the at least two compressors includes a housing and a respective internal independent electrical motor to drive a respective compressor body contained within said housing, and wherein the plurality of compressors share a common suction line and share a common discharge line, each of the respective compressor bodies of the at least two compressors being driven only by the respective internal independent electrical motor thereof; and selectively operating the at least two refrigerant compressors based on saturated condensing temperature.

21. The method of claim 20, further comprising:

sensing a suction pressure upstream of the at least refrigerant compressors; and determining the saturate condensing temperature based on the suction pressure.

22. The method of claim 20, wherein the saturated condensing temperature is determined by at least one factor selected from the group consisting of: demand load, actual temperature, refrigerant pressure, and seasonal date data.

23. The method of claim 20, further comprising:

selectively operating the refrigerant compressors in response to a load demand;

determining which of the different refrigerant compressors are more efficient at a present state of the saturated condensing temperature;

operating only the refrigerant compressors determined to be more efficient at the present state of the saturated condensing temperature to satisfy the demand load; and operating the refrigerant compressor determined to be less efficient in the event the demand load cannot be satisfied by the refrigerant compressors determined to be more efficient.

24. The method of claim 20, wherein the compressor housing of each of the at least two compressors completely encloses compressor bodies of each one of the at least two compressors.

25. The method of claim 24, further comprising:

selectively operating the refrigerant compressors in response to a load demand;

operating only the refrigerant compressors having a lowest volume index at a low load demand;

operating all of the refrigerant compressors at a maximum load demand.

26. The method of claim 25, further comprising:

operating a mix of refrigerant compressors with different volume indexes at an intermediate load demand between lowest and maximum load demand to attempt to optimize efficiency.

27. The method of claim 25, further comprising operating only the refrigerant compressors having the lowest volume index at an intermediate load demand between lowest and maximum load demand to attempt to optimize efficiency.

28. The method of claim 25, further comprising operating only the refrigerant compressors having the highest volume index at an intermediate load demand between lowest and maximum load demand to attempt to optimize efficiency.

29. The method of claim 20, further comprising:

configuring a combination of scroll compressors of different index volumes based upon at least one of climate location and geographic location.

30. The method of claim 29, wherein said configuring comprises including more scroll compressors of a higher index volume in some locations and more scroll compressors of a lower index volume in some locations.

31. The method of claim 20, further comprising:

compressing refrigerant from a common suction refrigerant pipe with at least some of the compressors and outputting compressed refrigerant along a common outlet pipe;

condensing the refrigerant received from the outlet pipe with a condenser heat exchanger;

expanding the condensed refrigerant in an expansion heat exchanger; and returning expanded refrigerant to the refrigerant compressors along the common suction refrigerant pipe.

32. The method of claim 20, further comprising operating an expansion unit independently of the at least two refrigerant compressors.

33. The method of claim 20, further comprising operating the at least two refrigerant compressors in a first bank of compressors, and operating at least two other refrigerant compressors in a second bank of compressors, wherein the first bank of compressors is configured to be operated independently from the second bank of compressors.

* * * * *